No. 614,806. Patented Nov. 22, 1898.
W. A. D. GRAHAM.
PNEUMATIC TIRE.
(Application filed Mar. 21, 1898.)

(No Model.)

W. A. D. Graham,
Inventor

Witnesses
L. C. Hills
G. E. Warner

By his Attorneys.

UNITED STATES PATENT OFFICE.

WILLIAM A. D. GRAHAM, OF TORONTO, CANADA.

PNEUMATIC TIRE.

SPECIFICATION forming part of Letters Patent No. 614,806, dated November 22, 1898.

Application filed March 21, 1898. Serial No. 674,600. (No model.)

*To all whom it may concern:*

Be it known that I, WILLIAM A. D. GRAHAM, a subject of the Queen of Great Britain, residing at Toronto, Province of Ontario, Dominion of Canada, have invented certain new and useful Improvements in Pneumatic Tires; and I do hereby declare the following to be a full, clear, and exact description of the invention, such as will enable others skilled in the art to which it appertains to make and use the same.

My invention has relation to pneumatic tires; and it consists in the novel construction and arrangement of its parts, as hereinafter described.

The object of the invention is to provide a tire consisting of a single tube, the tire being made in a strip and having edges adapted to interlock and in so doing form an air-tight junction.

The further object of the invention is to provide a suitable valved nipple through which the tire may be inflated, said valve extending through the tire to one side of the rim, and thus preventing the possibility of cutting or interfering with the nipple should the tire creep or move longitudinally on the rim.

Figure 1:
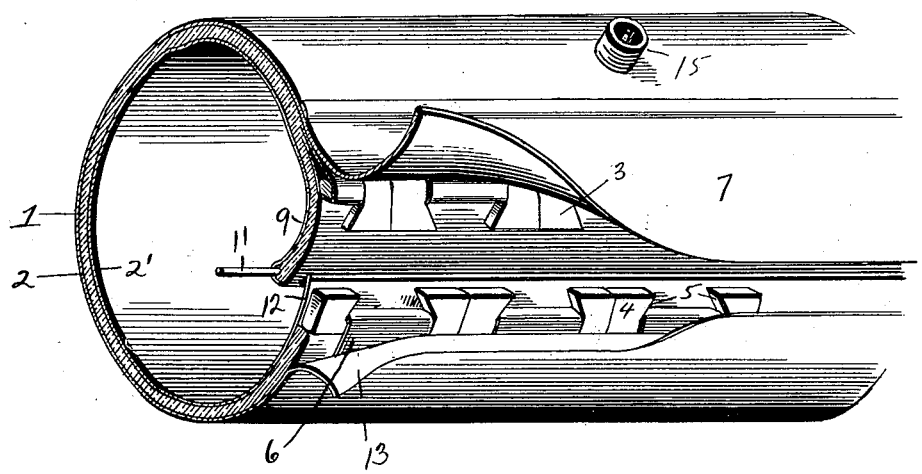
Figure 2:
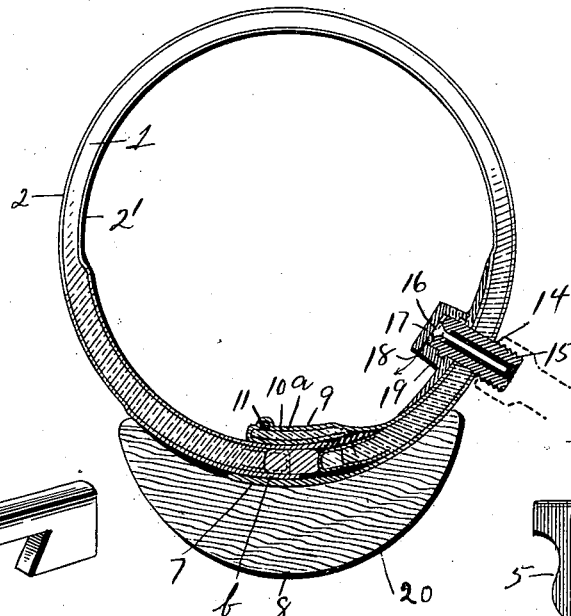
Figure 3:
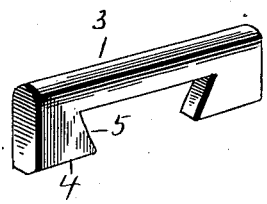
Figure 4:
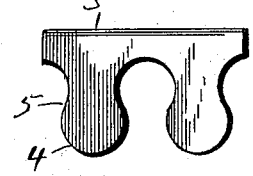

In the accompanying drawings, Figure 1 is a perspective view of a portion of the tire. Fig. 2 is a transverse sectional view of the tire and the rim. Fig. 3 is a perspective view of one form of the interlocking devices, and Fig. 4 is a plan view of another form of the interlocking devices.

The tire consists of the continuous strip of flexible material 1, said strip being coated on its inner and outer surfaces with soft rubber 2 and 2'. The intermediate portion of the tire is made of canvas or any other tough flexible material, and at the longitudinal edges of the strip 1 the interlocking devices 3 3 are confined. The interlocking devices 3 are made, preferably, of aluminium and are about one inch in length. The said devices have on their outer edges the projections 4, said projections having the inclined inner surfaces 5, the projections of the interlocking devices on one edge of the tire being adapted to engage and interlock with the projections of the devices on the opposite edge of the tire, as shown in Fig. 2. Thus a sectional interlocking device is made, the sections permitting the tire to conform to the contour of the wheel-rim. The interlocking devices 3 3 may be secured at the edge of the tire by any suitable means, as shown in Fig. 1. The said devices are confined by means of the flexible strips 6, which are secured at their ends on opposite sides of the edges of the tire and at their intermediate portions pass around the intermediate sections of the devices 3.

At one edge of the tire 1 the flexible flap 7 projects from the outer side of the tire. Said flap is adapted to be cemented or otherwise secured to the wheel-rim 8, as shown in Fig. 2, the said flap 7 being preferably made of soft rubber reinforced with fabric. From the same edge of the tire 1, but on the inner side, the flexible flap 9 is located, and the opposite edge of outer cover is extended to form flap 20, the said flaps 9 and 20 being made, preferably, of soft rubber, and the said flaps 9 and 20 are provided in their interior with reinforcing flexible strips 10, the inner and outer surfaces of the strips 10 being covered with soft rubber. The cord or wire 11 is located in the flap 9. The said cord or wire 11 is adapted to be tightened by any suitable means, such as ratchets, now commonly used for this purpose. Thus after the interlocking devices 3 are engaged with each other they are held laterally in place, and the soft-rubber surfaces above described form air-tight joints about the said interlocking devices. Thus when the tire is inflated the internal pressure is exerted on the surfaces *a* and *b*, and thus the possibility of the escapement of air at the joint is prevented, as illustrated in Fig. 1. The flaps 12 and 13 are adapted to extend beyond the interlocking devices, located on the same edge of the tire 1. The nipple of the valve 14 extends through the tire 1, just beyond the edge of the wheel-rim 8, as illustrated in Fig. 2. The said valve consists of the metallic cylinder 15, adapted to be connected at its outer end to a suitable inflating device, and the valve proper, 16, is located in the interior of the said cylinder, the stem of the said valve 16 extending nearly to the outer end of the said cylinder 15. The inner end of the valve 16 is cemented or otherwise secured to the flexible diaphragm 17, and a slight opening 18 is located just below the diaphragm 17 and the rubber section 19.

The tire is put in position upon the wheel-rim as follows: The flap 7 is cemented or otherwise secured in place on the rim 8. The devices 3 on the opposite edges of the tire 1 are interlocked and the cord or wire 11 is tightened. The air is then injected through the valve 14, and as the tire fills the internal pressure bears laterally upon the surface $a$, and thus prevents any escapement of the air along the interlocking edge. The air as it is forced through the cylinder 15 displaces the valve 16 and the diaphragm 17, thus opening the vent 18. The air thus enters the tire. The internal pressure of the tire bears upon the inner surface of the diaphragm 17, and thus brings the said diaphragm 17 in close contact with the rubber section 19, and the vent 18 is thus closed, thus preventing any escapement of air at the valve.

Having thus described my invention, what I claim as new, and desire to secure by Letters Patent, is—

A tire consisting of a strip, sectional interlocking devices located at each edge of said strip, each section having inward projections adapted to engage similar projections of the opposite devices, flexible flaps located at the edges of the strip and adapted to form airtight joints about the interlocking devices, and a suitable means whereby air is injected into the tire.

In testimony whereof I affix my signature in presence of two witnesses.

WILLIAM A. D. GRAHAM.

Witnesses:
 JNO. M. GODFREY,
 E. R. REYNOLDS.